June 17, 1969         F. C. WEBER, JR         3,450,295
REPAIRING METAL TANK BOTTOMS
Filed June 4, 1965
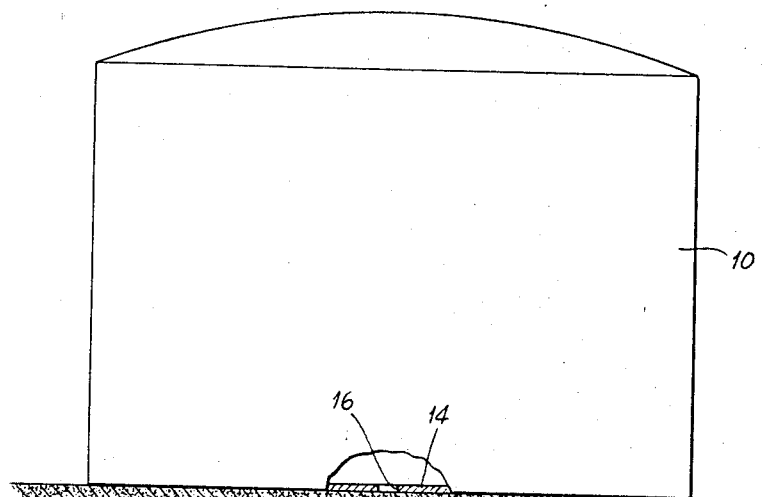
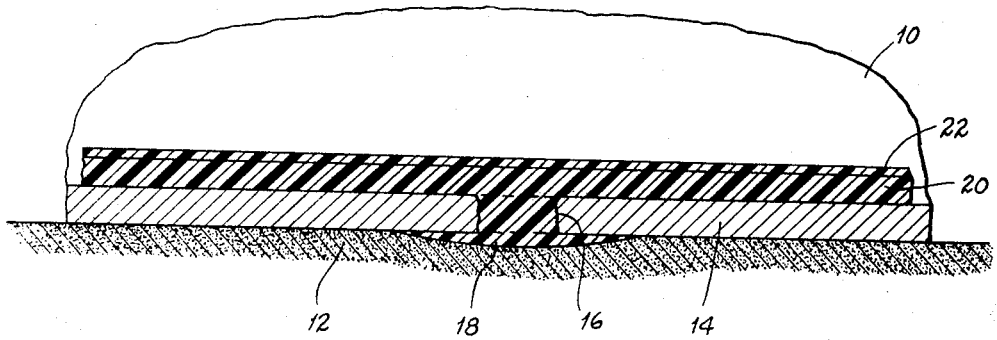
INVENTOR:
FRED C. WEBER, JR.
BY Kingsland, Rogers, Ezell, Eilers, & Robbins
ATTORNEYS United States Patent Office 3,450,295
Patented June 17, 1969

3,450,295
REPAIRING METAL TANK BOTTOMS
Fred C. Weber, Jr., St. Louis, Mo., assignor to Phelan-Faust Paint Manufacturing Company, St. Louis, Mo., a corporation of Missouri
Filed June 4, 1965, Ser. No. 461,346
Int. Cl. B65d 25/24
U.S. Cl. 220—18          1 Claim

ABSTRACT OF THE DISCLOSURE

A method for patching metallic tank bottoms which may have pitted holes of substantial size embodying the employment of a foamed plastic material. The foamed plastic material such as a polyurethane, epoxy or vinyl resin is employed in a thickness of about at least three-eighths of an inch and has a density of 1.5 to 20 pounds per cubic foot. The foam has a viscosity to penetrate the holes and where the metallic tank bottom rests upon a sand substrate to bridge over the underneath side of the hole to form a plug. The foamed coating has a tough smooth and skin-like exterior surface facilitating cleaning and may be topped with an impervious chemically inert urethane epoxy or vinyl paint as a further sealant.

---

This invention relates to improvements in the repair of oil tank bottoms and the improved structures resulting therefrom, and, in particular, is concerned with the use of foamed plastic compositions, such as polyurethane foams and the like.

In the past oil tank bottoms have been subject to corrosion and pitting due to the corrosive nature of impurities in crude oil and their sludges. The repair of such tanks, which may be 100 feet or more in diameter and 40 feet high, has been quite expensive and has conventionally been effected by the installation of new steel plate bottoms or welding of the corroded area. Such repair has been expensive and time consuming, and requires the use of highly skilled workmen.

By means of the present invention there has been provided an improved tank bottom structure utilizing a foamed cellular plastic layer, which can be laid down in situ over the bottom. Various types of foamed plastics may be laid down by a spray gun and other similar equipment, and a foamed polyurethane material has been found to be preferable, although other foamed plastic, such as vinyl plastics and epoxy plastics, can be used. It has been found that the foamed plastic can be laid down in a coating of 3/8" or so to bridge pitted openings which may be as much as 4" wide and several feet or more in length to provide a load bearing structure. The polyurethane foam when laid down is resistant to attack by chemicals conventionally found in crude oil, and provides a load bearing structure that tenaciously adheres to the steel tank bottom. Further, where pitted openings occur, it has been found that the foamed polyurethane penetrates these openings and forms a bead, much of the nature of a rivet, in the sand or soil substrate underneath the tank bottom and upon which the bottom rests to provide a bottom plug of greater width than the opening so that the polyurethane foam is firmly anchored.

The tank bottom can be simply repaired, after preliminary sand blasting and primer preparations by the laying down of the foam through a spray gun by workmen without a long period of down time for the oil tanks, and with a considerable reduction in expense over the conventional repair of the tank bottom by laying down a new still bottom or by repairing by welding. The life of the tank bottom repaired by the foamed plastic coating of this invention is quite lengthy and meets the requirements of usage in the industry.

The above features are objects of this invention and further objects will appear in the detailed description which follows and will be otherwise apparent to those skilled in the art.

For the purpose of illustration of this invention, there is shown in the accompanying drawing a typical coating laid down by the method of this invention. This is for the purpose of illustration only, and the invention is not limited thereto.

In the drawings:

FIGURE 1 is a view in elevation of a typical tank with a cut-out portion in cross section showing the application of a foamed coating of this invention; and FIGURE 2 is an enlarged view in cross section of the cut-out portion of FIGURE 1 showing the relation of the foamed coating to the tank bottom, and the repair of a pitted opening in the steel tank bottom with the formation of a plug or rivet by the foamed coating which penetrates to the substrata upon which the bottom rests.

Oil tanks used in refineries, and for which this method applied to the repair of such tank bottoms, conventionally carry various types of petroleum raw materials and products, including sour crude oil, whiteoil, kerosene, naphtha, gasoline, benzine, xylene, toluene, propane, butane, and methylethylketone. Such products have a wide degree of corrosive chemical constituents found in the sludges, and the like, settling on the tank bottom, which include hydrochloric acids, sulphuric acid, nitric acid, phosphorous acid, sodium hydroxide, ammonium hydroxide, sodium chloride, ethyl alcohol, ethanolamine, and various types of soaps. Such chemical constituents can be highly corrosive to steel, while the foamed plastic coatings of this invention are generally inert to the petroleum products in which these constituents are found.

The polyurethane foam preferred in this invention is a conventional foam material and can be in the range of 1.5 to 20 pounds per cubic foot density when laid down. The preferred range is about 5 to 10 pounds and it has been found that this foam will withstand a load of 300 p.s.i. so that a full load bearing structure is provided. Further, when the polyurethane foam is laid down a skin at the top of the foam is formed, which is tough and smooth and makes it quite easy to flush off any sludge remaining in the tank bottom after it is drained. This is quite advantageous, since such tanks are drained from time to time and it is desired to remove the sludge, or other corrosive contaminant, which settle at the bottom of the tank to minimize any corrosive action over long periods of time. The polyurethane foam may be either poured upon the tank bottom or sprayed, although the best application is in spraying where the tough top skin is formed in this in situ process of application. The foam is laid down upon the conventional metal tank bottom and can incorporate in it various corrosion inhibitive pigments.

Poylurethane foams are well known in the art and this invention merely employs conventional polyurethane compositions which, as described above, may be of varying density. The foamed polyurethanes are conventionally prepared by reacting various polyols with various types of isocyanates, such as diisocyanate, triisocyanate, or polyisocyanates. The cellular structure employed in the foam may be obtained by using an excess of isocyanate with water, or by the employment of various gaseous blowing agents, such as those of the hydrocarbon or halogenated hydrocarbon classes. The density is varied by the usual change in process limitations and proportions of the components used, as is well known in the art.

In the method of repairing the tank bottoms, the tank bottoms are first cleaned as well as possible and then sand blasted to provide a rough sourface for adhesion of the ultimate coating. After sand blasting, the surface is then treated with any good metal primer, such as a vinyl wash primer, or an epoxy high build primer. The tank bottom is then ready for application of the foamed coating, which is applied to a substantial thickness such as ⅜". A typical example is given below for the method of this invention.

Example

A crude ol tank of 140′ diameter and about 40′ in height was treated. This tank was first removed from service and then cleaned. The roof was sealed to protect the tank bottom from rain during further operations. The floor and the bottom two feet of the tank wall were then sand blasted to thoroughly prepare these metal surfaces. Application of a vinyl wash primer to preserve the sand blast surfaces was then effected. A polyurethane foam was then laid down to provide a minimum thickness of ⅜". This foam was in the range of 7 to 10 pounds per cubic foot. The coating was permitted to cure for one week and then the tank bottom was returned to service.

In the spray gun application of this example, the prepolymer and polyol are kept separate and then mixed in the spray gun where they are atomized and then laid down upon the surface of the tank bottom. The foam, when laid down by the spray gun, begins to cream within a matter of seconds and rises very rapidly to its ultimate height in the order of about one minute of time. The sprayed material, when first laid down, has a good degree of fluidity and will penetrate any corroded openings or pit holes through these openings and into the substrata, which is conventionally sand or any type of permeable sub-soil.

Reference is made to FIGURES 1 and 2 where a coating laid down upon a tank bottom is shown. In these figures, FIGURE 1 shows a tank 10 with bottom 14 resting on a ground surface 12. As shown in FIGURE 2, the steel tank bottom 14 rests upon the ground which is conventionally sand or other porous sub-soil. The steel tank bottom 14, as shown in FIGURE 2, has a corroded opening 16, and the polyurethane foam when laid down will penetrate through this and into the sub-soil underneath, and, because of its penetration through capillary action through the sub-soil, a bead or rivet 18 will be formed on the underneath side of the steel tank bottom on either side of the pitted opening. When finally cured, the polyurethane coating, generally identified by the reference numeral 20, will have a thickness of about ⅜" and will have a top skin layer 22, which is quite tough and durable and smooth. Thus, as mentioned previously, when the tank is drained, sediments and sludges and contaminants can be simply brushed or flushed off this slick and tough top skin coating of the polyurethane foam structure. This skin layer can be coated with a material, such as an epoxy or urethane paint, to further seal the surface if so desired.

In the laying down of the coating, it is desirable that the steel tank bottom be at room temperature in the general range of 65° F. to 95° F. It is further desirable that the foam be laid down under substantially dry conditions after the sand blasting and primer operations have been carried out.

The polyurethane coating, accordingly, has been found to provide a very desirable repair method for steel tank bottoms with ease of application at relatively low cost, and of a high degree of inertness to the contaminants normally found in refinery raw materials and products. It will be apparent to those skilled in the art that other foamed coatings that are inert and are load bearing, and that can penetrate and/or bridge pitted openings and form the anchor type plug of this invention in the subsoil or substrata, can be employed. Thus, a vinyl foam, which forms a tough skin on the top surface of the coating can be employed, as can the epoxy foams, although they do not provide a particularly tough or slick skin at the top of the coating.

What is claimed is:
1. A tank bottom of metal resting upon a sand substrate, said metal tank bottom having an impervious chemically resistant foam coating of at least about ⅜" thickness bonded to the tank bottom selected from the group consisting of polyurethane, epoxy and vinyl foams having a density of 1.5 to 20 pounds per cubic foot, said foamed coating bridging holes in the metal tank bottom and providing a load bearing structure and having a tough, smooth and skin-like exterior surface, said foam further penetrating the sand substrate beneath and to the side of the holes to form an integral bead with the foamed coating to plug and anchor the foamed coating in said hole.

References Cited

UNITED STATES PATENTS

| | | | |
|---|---|---|---|
| 2,979,416 | 4/1961 | Drexler | 117—97 X |
| 3,030,249 | 4/1962 | Schollenberger et al. | 117—75 X |
| 3,211,573 | 10/1965 | Hight et al. | 117—2 X |

FOREIGN PATENTS 640,547  5/1962  Canada.

ALFRED L. LEAVITT, *Primary Examiner.*

THOMAS E. BOKAN, *Assistant Examiner.*

U.S. Cl. X.R.

52—169, 309; 117—2, 75, 132, 161; 220—64